Patented Feb. 14, 1928.

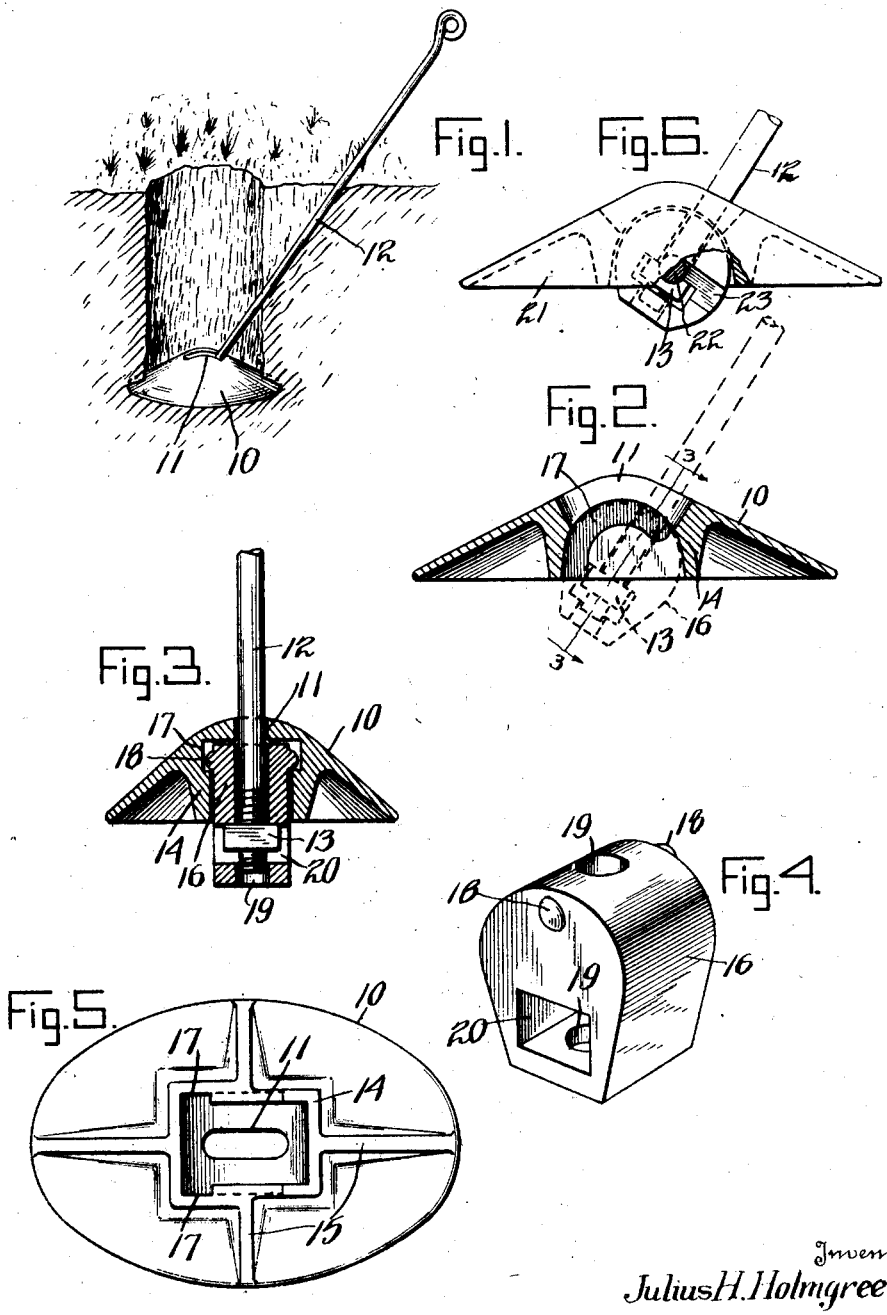

1,659,527

UNITED STATES PATENT OFFICE.

JULIUS HERMAN HOLMGREEN, OF SAN ANTONIO, TEXAS.

GUY-WIRE ANCHOR.

Application filed December 31, 1926. Serial No. 158,325.

My said invention relates to a guy wire anchor for poles, posts or the like and it is an object of the invention to provide a device of this character having parts so constructed that no matter what angle the anchor rod assumes relative to the anchor body the pull on the anchor rod and nut to which it is threaded will be at right angles to said nut so that a proper seat for the nut is provided without bending the rod adjacent the anchor body when stress is applied, all as will be hereinafter more fully described and claimed.

Referring to the accompanying drawings, which are made a part hereof and on which similar reference characters indicate similar parts, Figure 1 is a perspective view illustrating one application of my invention, Figure 2, a central longitudinal section, Figure 3, a transverse section on line 3—3 of Figure 2, Figure 4, a perspective of the oscillating member, Figure 5, a bottom plan view, and Figure 6, a side elevation, with parts broken away, illustrating a modified form of invention.

In the drawings reference character 10 indicates a body or anchor plate which is preferably oval or cup-shaped and in which is provided a longitudinally disposed slot 11 through its top through which an anchor rod 12 is adapted to extend for engagement with a nut 13. The body is provided on its underside with a recess or pocket comprising a depending flange 14 of substantially square outline reenforced by ribs extending longitudinally and transversely. The bottom of the pocket is curved to provide a bearing surface for cooperation with a bearing element 16 which is substantially an oscillating washer having an opening 19 therethrough through which the anchor rod is adapted to extend. The washer 16 is provided with a nut receiving recess 20 in order that the nut may be properly held in place but permitting the rod to be screwed or unscrewed through the same and the nut as desired.

It will be noted that the washer 16 is substantially horse-shoe shaped in cross section, such shape permitting it to be oscillated freely within the pocket of the device and in order to maintain the bearing element or washer within the pocket I provide a relatively small projection or protuberance 18 on each end substantially adjacent the center of the same and provide an arcuate slot 17 in the side walls of the pocket, said slot being open at one end to permit insertion of the protuberance 18 thereinto.

In assembling the device it is necessary to place the bearing element or washer 16 within the pocket and rotate the same slightly before the anchor rod can be inserted, after which the nut is inserted in proper position and the anchor rod is screwed into the nut. On account of the opening 19 which is entirely through the bearing element or washer the anchor rod 12 may be rotated for tensioning the cable or the like to which it may be attached and no matter what position the anchor rod assumes relative to the anchor body the pull on the anchor rod will always be at right angles to the nut 13, obviating any possibility of bending the rod adjacent the anchor body under the stress being applied. Since the anchor rod is not bent it may be readily removed if it becomes desirable to abandon the anchor.

As shown in Figure 6 instead of the anchor plate being provided with a slot in one side for engagement by protuberances on the oscillating washer an anchor plate 21 may be provided with oppositely disposed inwardly extending projections 22 and grooves 23 may be formed in the side of the oscillating washer to permit the projections to pass therethrough for retaining the washer in position.

In using my anchor all that is necessary is to dig a round hole in the earth sufficient to permit the anchor to pass downwardly thereinto whereupon the anchor may be tapped by a bar or the like and forced to a substantially horizontal position at right angles to the hole giving an area of substantially greater diameter than the diameter of the hole. The hole is then filled with earth and stress applied to the guy wire which is disposed at an angle to the hole will cut a groove in the earth to permit the guy wire to straighten out or if desired this groove may be cut and the guy rod disposed therein prior to the application of tension.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. An anchor comprising a body having a pocket on its underside, a slot through said body, a bearing member mounted in said pocket and capable of being oscillated therein, and a rod extending through the slot in said body and adjustably connected to said oscillating member, substantially as set forth.

2. The combination of a body having a slot therethrough, a pocket on the underside of said body communicating with said slot, a member mounted to oscillate in said pocket, and a guy rod extending through said slot and adjustably connected to said oscillating member, substantially as set forth.

3. The combination of a body having a slot therethrough, a pocket on the underside of said body communicating with said slot, a member mounted to oscillate in said pocket and having an opening therethrough with a recess disposed transversely of said opening, a guy rod disposed in said opening, and a nut disposed in said recess and threaded on said guy rod, substantially as set forth.

4. The combination of a body having a slot therethrough, a pocket on the underside of said body communicating with said slot, a recess in each side of said pocket, a bearing member mounted in said pocket and capable of being oscillated therein, said bearing member having a protuberance extending into each recess for preventing accidental separation of the parts, and a rod extending through the slot in said body and connected to said oscillating member, substantially as set forth.

5. The combination of a body having a slot therethrough, a pocket on the underside of said body communicating with said slot, a recess in each side of said pocket, a bearing member mounted in said pocket and capable of being oscillated therein, said bearing member having a protuberance extending into each recess for preventing accidental separation of the parts, and a rod extending through the slot in said body and connected to said oscillating member, each of said recesses having an opening at one end permitting the protuberance to be inserted and removed therethrough, substantially as set forth.

6. The combination of a body having a slot therethrough, a pocket on the underside of said body communicating with said slot, a recess in each side of said pocket, a bearing member mounted in said pocket and capable of being oscillated therein, said bearing member having a protuberance extending into each recess for preventing accidental separation of the parts, and a rod extending through the slot in said body and connected to said oscillating member, each of said recesses having an opening at one end permitting the protuberance to be inserted and removed therethrough, the arrangement being such that when the rod is disposed in the bearing member the protuberance is prevented from moving sufficiently to pass through the ends of the recesses, substantially as set forth.

7. The combination of a body having a slot therethrough, a pocket on the underside of said body communicating with said slot, a member mounted to oscillate in said pocket, a guy rod extending through said slot and connected to said oscillating member, and means for retaining the oscillating member in said pocket when the guy rod is inserted, substantially as set forth.

In witness whereof, I have hereunto set my hand at San Antonio, Texas this 20th day of December, A. D. nineteen hundred and twenty-six.

JULIUS HERMAN HOLMGREEN.